United States Patent [19]

Tank et al.

[11] Patent Number: 4,941,892
[45] Date of Patent: Jul. 17, 1990

[54] TOOL COMPONENT

[76] Inventors: Klaus Tank, 9 Warbleton Avenue, Essexwold, Bedforview, Transvaal; Noel J. Pipkin, 138-140 Pritchard Street, Johannesburg North, Transvaal; Nicholas Mastrantonis, 8 Field Place, Edenglen Extension 21, Edenvale, Transvaal, all of South Africa

[21] Appl. No.: 218,643

[22] Filed: Jul. 13, 1988

[30] Foreign Application Priority Data

Jul. 14, 1987 [ZA] South Africa .................. 87/5131

[51] Int. Cl.⁵ .............................................. B24D 3/02
[52] U.S. Cl. .................................... 51/309; 51/295
[58] Field of Search ............................... 51/295, 309

[56] References Cited

U.S. PATENT DOCUMENTS

| 4,373,934 | 2/1983 | Hayden | 51/309 |
| 4,505,721 | 3/1985 | Almond et al. | 51/309 |
| 4,527,998 | 6/1985 | Knemeyer | 51/309 |
| 4,705,123 | 11/1987 | Dennis | 51/309 |
| 4,772,294 | 9/1988 | Schroeder | 51/309 |

Primary Examiner—Paul Lieberman
Assistant Examiner—Willie J. Thompson
Attorney, Agent, or Firm—Scully, Scott, Murphy & Presser

[57] ABSTRACT

A tool component comprises an abrasive compact bonded to a support which itself is bonded through an alloy to an elongate cemented carbide pin. The alloy has a liquidus below 900° C. and the following composition, by weight:

| Mn | 15–41% |
| Cu | 67–41% |
| Ni | 1–5% |
| Au | 10–17% | and at least one of In, Sn, Zn and Ag, the In and Sn, when present, being in an amount not exceeding 20% by weight and the Zn and Ag, when present, being in an amount not exceeding 30% by weight.

The shear strength of the bond achieved between the support and the pin exceeds 335 MPa.

9 Claims, 1 Drawing Sheet

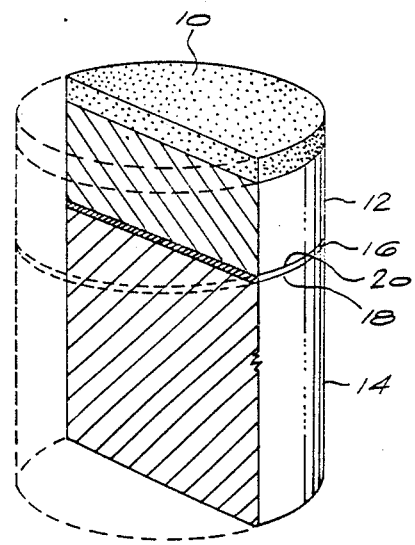

TOOL COMPONENT

BACKGROUND OF THE INVENTION

This invention relates to tool components.

Abrasive compacts are well known in the art and are used for a variety of abrading operations such as cutting, drilling, grinding, and the like. Abrasive compacts consist of a polycrystalline mass of bonded abrasive particles, the abrasive particle content of which is at least 70 percent by volume, and generally 80 to 90 percent by volume. The abrasive particles may be self-bonded without the aid or use of a second or bonding phase. Alternatively, a second or bonding phase may be provided. The abrasive particles for compacts are invariably diamond or cubic boron nitride.

Abrasive compacts may be bonded to cemented carbide supports. Such bonded compacts are often referred to as composite compacts. Bonding between the compact and the carbide support may be direct, i.e. without the interposition of a braze layer. Alternatively, a bonding braze layer may be provided between the compact and the carbide support. A more detailed description of abrasive compacts and composite abrasive compacts may be found in a number of published patent specifications, for example, U.S. Nos. 3,743,489, 3,767,371, 4,063,909 and 3,745,623.

Rotary drills used for oil and gas well drilling and core drilling generally comprise a drill bit having formed thereon a plurality of pre-formed sockets in which cutting elements or components are mounted. The cutting elements or components may be brazed, force-fitted or heat shrunk into the sockets. Typical cutting elements used in the prior art are steel teeth, steel teeth laminated with tungsten carbide, inserts of cemented tungsten carbide, natural diamonds and composite abrasive compacts.

Cutting components for drill bits and utilising composite compacts have been described in the literature and have been used commercially. Such cutting components comprising an elongate pin of cemented carbide to which is bonded a composite compact, bonding being achieved through the carbide support of the composite compact. Bonding between the carbide support and the elongate pin is achieved by braze metal which has a melting point above 700° C. Such a high temperature braze, so the art teaches, is essential in order to achieve a sufficiently strong bond between the composite compact and the elongate pin. Reference in this regard may be had to disclosures of U.S. Pat. No. 4,225,322. The braze which is said in this patent specification to be useful is Anaconda 773 which is now thought to be undesirably reactive with the carbide pieces being joined. European Patent Publication 213,300 and U.S. Pat. No. 4,527,998 describe braze alloys for bonding composite abrasive compacts to elongate pins which are said to have advantages over Anaconda 773. The alloy of the European publication contains palladium, chromium, boron and nickel while the alloy of the U.S. patent contains gold, nickel, palladium, manganese and copper.

Tool components are also available and used which comprise two carbide bodies bonded together or a carbide body bonded to a steel or like body. Strong bonds between such bodies are desirable.

SUMMARY OF THE INVENTION

According to the present invention, there is provided a tool component comprising a cemented carbide body bonded to a metal containing body by a braze alloy having a liquidus below 900° C. and having the following composition, by weight:

| | |
|---|---|
| Mn | 15–41% |
| Cu | 67–41% |
| Ni | 1–5% |
| Au | 10–17% | and at least one of In, Sn, Zn and Ag, the In and Sn, when present, being in an amount not exceeding 20% by weight and the Zn and Ag, when present, being in an amount not exceeding 30% by weight; and the shear strength of the bond between the bodies exceeding 335 MPa.

The bodies may be bonded together by placing a layer of the braze alloy between surfaces of the bodies, urging the surfaces together, and raising the temperature of the alloy to its working temperature thereby creating a bond between the surfaces which has a shear strength exceeding 335 MPa.

DESCRIPTION OF THE DRAWING

The drawing illustrates a partially sectioned perspective view of an embodiment of a tool component of the invention.

DETAILED DESCRIPTION OF THE INVENTION

Essential to the invention is the choice of the braze alloy which has a liquidus below 900° C. and which produces a bond strength exceeding 335 MPa. This braze alloy allows for a strong bond between the surfaces to be created at a low temperature. Preferably the shear strength of the bond between the surfaces is 400 MPa or higher. The liquidus of the braze alloy is preferably in the range 800° C. to 850° C. The liquidus temperature of the braze alloy is that temperature at which the alloy starts to melt. The working temperature is that temperature at which substantially all the alloy is in a molten state and is somewhat higher than the liquidus temperature. Generally the working temperature will be 10° to 50° C. higher than the liquidus temperature.

In the alloys useful in the practice of the invention, the In and Sn, when present, are preferably present in an amount not exceeding 15% by weight and the Zn and Ag, when present, are preferably present in an amount not exceeding 20% by weight.

The metal containing body will generally also be a cemented carbide body. The cemented carbide may be any known in the art such as cemented tungsten carbide, cemented tantalum carbide, cemented titanium carbide, or mixtures thereof.

The cemented carbide body will preferably have an abrasive compact bonded to it. The degradation temperature of the abrasive compact is preferably at or above the working temperature of the alloy. The degradation temperature of the abrasive compact is that temperature at which substantial degradation of the abrasive particles of the compact occurs. The abrasive compact is preferably a diamond abrasive compact. The invention has particular application to large diamond abrasive compacts, i.e. those having a diameter of 30 mm or larger.

The method of bonding the cemented carbide surface to the other surface will be described with reference to the drawing. A composite abrasive compact comprising an abrasive compact layer 10 bonded to a cemented carbide support 12 is provided. There is also provided an elongate cemented carbide pin 14. A layer 16 of the braze alloy is placed between the upper flat surface 18 of the pin 14 and the lower flat surface 20 of the support 12. The alloy layer 16 makes contact with both the surfaces 18 and 20. These surfaces are then urged together, for example by means of a suitable clamp or load otherwise applied. The temperature of the braze layer is raised to its working temperature. The alloy may be raised to its working temperature over a period of 5 to 20 minutes in a furnace. Alternatively, localised heating such as induction heating may be used in which case the temperature will be raised over a much shorter period, e.g. less than 150 seconds. A bond having a shear strength exceeding 335 MPa is created between the support and the pin without any significant degradation to the abrasive compact occurring.

The invention will be illustrated by the following examples.

EXAMPLE 1

A composite diamond abrasive compact consisting of a diamond abrasive compact having a degradation temperature exceeding 915° C. bonded to a cemented tungsten carbide support was bonded to a cemented carbide substrate using a braze alloy which has the following composition, by weight:

| | |
|---|---|
| Cu | 47,7% |
| Mn | 26,1% |
| Au | 13% |
| Ni | 3,2% |
| In | 10% |

The liquidus temperature of this alloy is 830° C. and its working temperature is 860° C.

The braze alloy was sandwiched between the cemented carbide support of the composite diamond abrasive compact and the cemented carbide substrate and a load applied to urge the two surfaces together. The temperature of the braze alloy was raised over a period of 10 minutes to a temperature of 860° C. and held there for 3–4 seconds. Heating took place in a furnace. After heating, the bonded assembly was removed from the furnace.

It was found that a strong bond having a shear strength of the order of 513 MPa was produced between the composite diamond abrasive compact and the substrate.

Using the same method as in Example 1, a composite diamond abrasive compact was bonded to a cemented carbide substrate using the braze alloys set out in the table below. The bond strengths are also set out in the Table.

TABLE

| Example | Cu | Mn | Au | Ni | In | Sn | Ag | Zn | l.t. | w.t. | Bond Strength |
|---|---|---|---|---|---|---|---|---|---|---|---|
| 2 | 48 | 29 | 14.5 | 3.5 | — | 5 | — | — | 850 | 880 | 428 |
| 3 | 47,7 | 26,1 | 13,0 | 3,2 | — | — | 10 | — | 860 | 880 | 490 |
| 4 | 45 | 24,7 | 12,3 | 3,0 | — | — | 15 | — | 850 | 870 | 407 |
| 5 | 42,5 | 23,2 | 11,6 | 2,8 | — | — | 20 | — | 840 | 860 | 434 |
| 6 | 47,7 | 26,1 | 13,0 | 3,2 | — | — | — | 10 | 890 | 930 | 448 |
| 7 | 45 | 24,7 | 12,3 | 3,0 | — | — | — | 15 | 870 | 890 | 432 |
| 8 | 42,4 | 23,2 | 11,6 | 2,8 | — | — | — | 20 | 860 | 870 | 421 |
| 9 | 48 | 29 | 14,5 | 3,5 | 5 | — | — | — | 870 | 890 | 469 |
| 10 | 45 | 24,7 | 12,3 | 3,0 | 15 | — | — | — | 830 | 850 | 453 |
| 11 | 42,4 | 23,2 | 11,6 | 2,8 | 20 | — | — | — | 800 | 820 | 345 |

In this table all quantities given are percentage by weight of the alloy. l.t. is the liquidus temperature of the alloy and w.t. is its working temperature, both temperatures being in degrees centigrade. The bond strengths are given in MPa.

We claim:

1. A tool component comprising a cemented carbide body bonded to a metal containing body by a braze alloy consisting of a liquidus below 900° C. and having the following composition, by weight:

| | |
|---|---|
| Mn | 15–41% |
| Cu | 67–41% |
| Ni | 1–5% |
| Au | 10–17% | and at least one of In, Sn, Zn and Ag, the In and Sn, when present, being in an amount not exceeding 20% by weight and the Zn and Ag, when present, being in an amount not exceeding 30% by weight; and the shear strength of the bond between the bodies exceeding 335 MPa.

2. A tool component according to claim 1 wherein the cemented carbide body has an abrasive compact bonded to it.

3. A tool component according to claim 2 wherein the abrasive compact has a degradation temperature at or above the working temperature of the braze alloy.

4. A tool component according to claim 2 wherein the abrasive compact is a diamond abrasive compact.

5. A tool component according to claim 1 wherein the metal containing body is a cemented carbide body.

6. A tool component according to claim 1 wherein the shear strength of the bond between the bodies is 400 MPa or higher.

7. A tool component according to claim 1 wherein the liquidus temperature of the alloy is in the range 800° C. to 850° C.

8. A tool component according to claim 1 wherein the alloy contains at least one of In and Sn in an amount not exceeding 15% by weight.

9. A tool component according to claim 1 wherein the alloy contains at least one of Zn and Ag in an amount not exceeding 20% by weight.

* * * * *